June 3, 1958     W. A. BARY     2,837,101
INFLATABLE STRUCTURE
Filed April 28, 1955     5 Sheets-Sheet 1
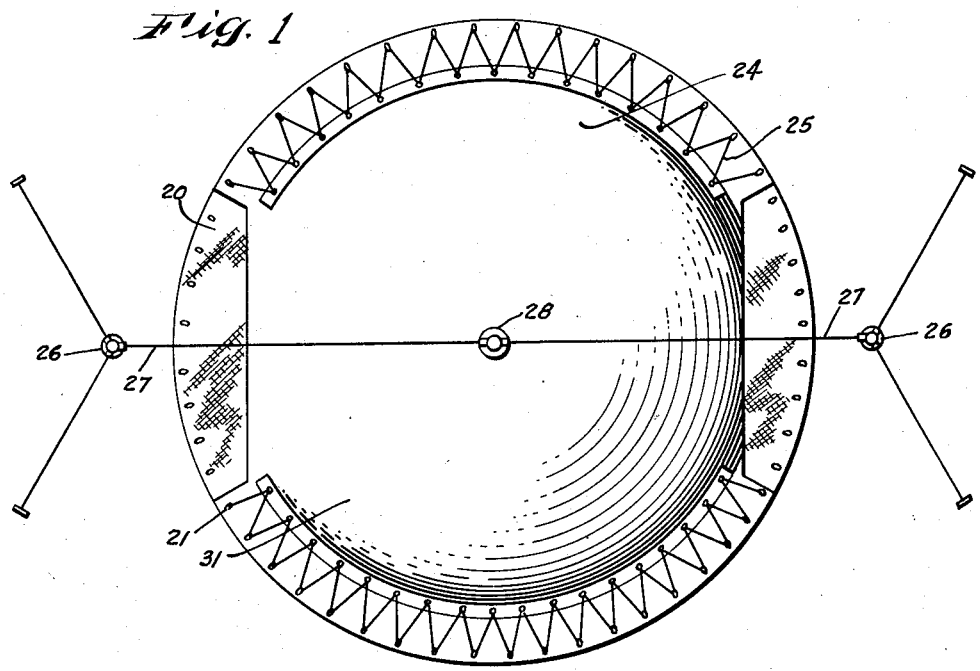
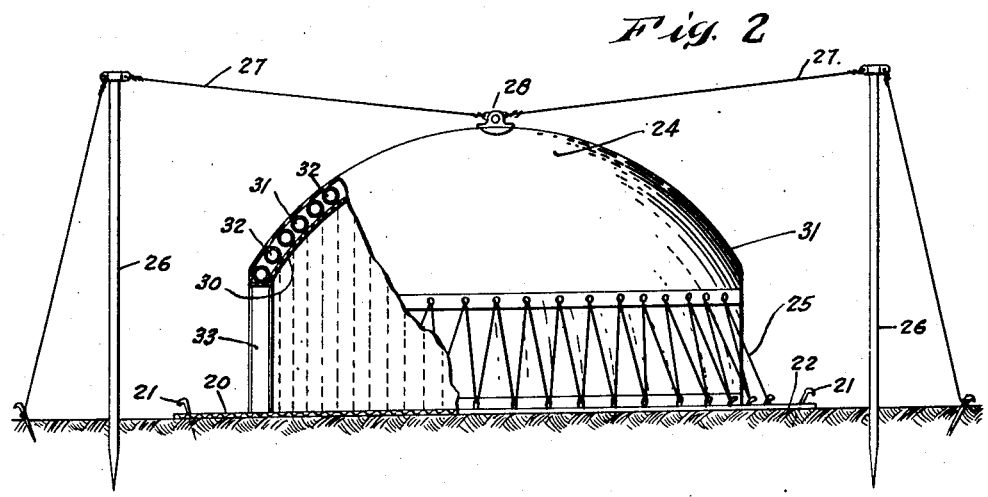
INVENTOR.
WOLDEMAR A. BARY
BY
Leo C. Krazinski
ATTORNEY June 3, 1958   W. A. BARY   2,837,101
INFLATABLE STRUCTURE
Filed April 28, 1955   5 Sheets-Sheet 2
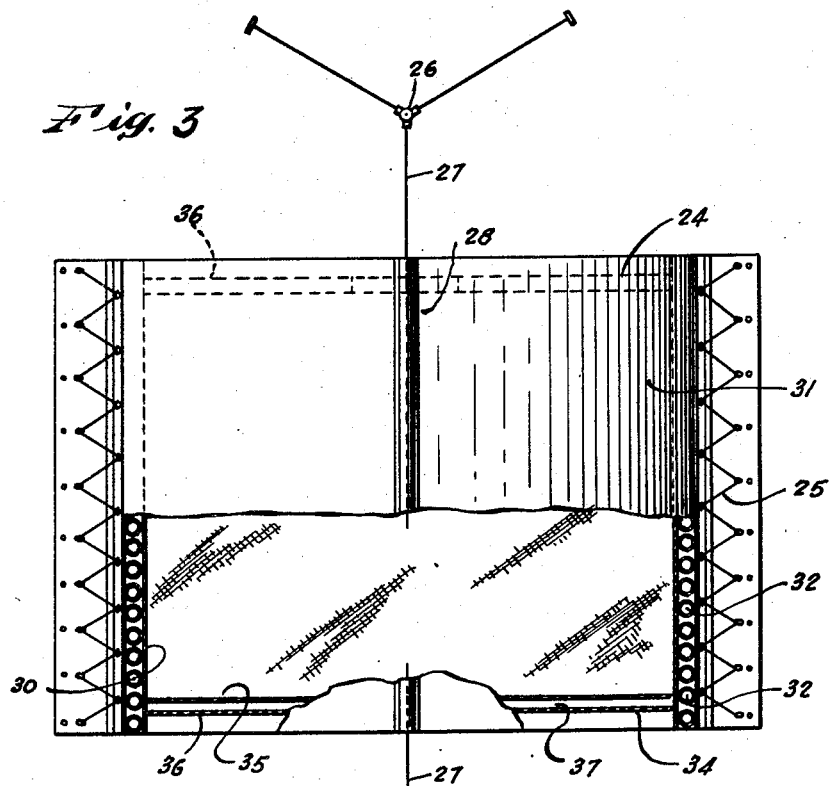
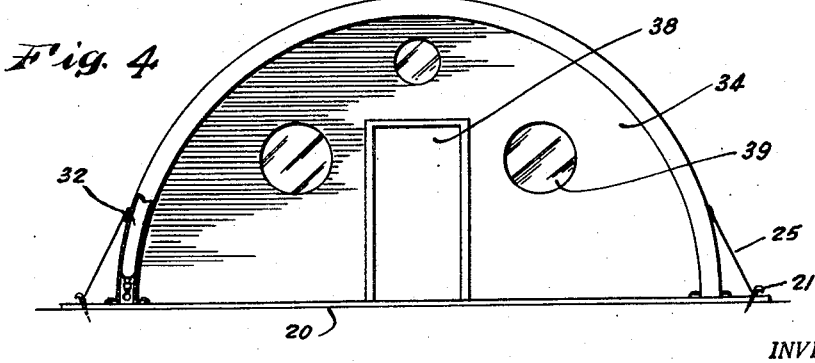
INVENTOR.
WOLDEMAR A. BARY
BY Leo C. Krazinski
ATTORNEY

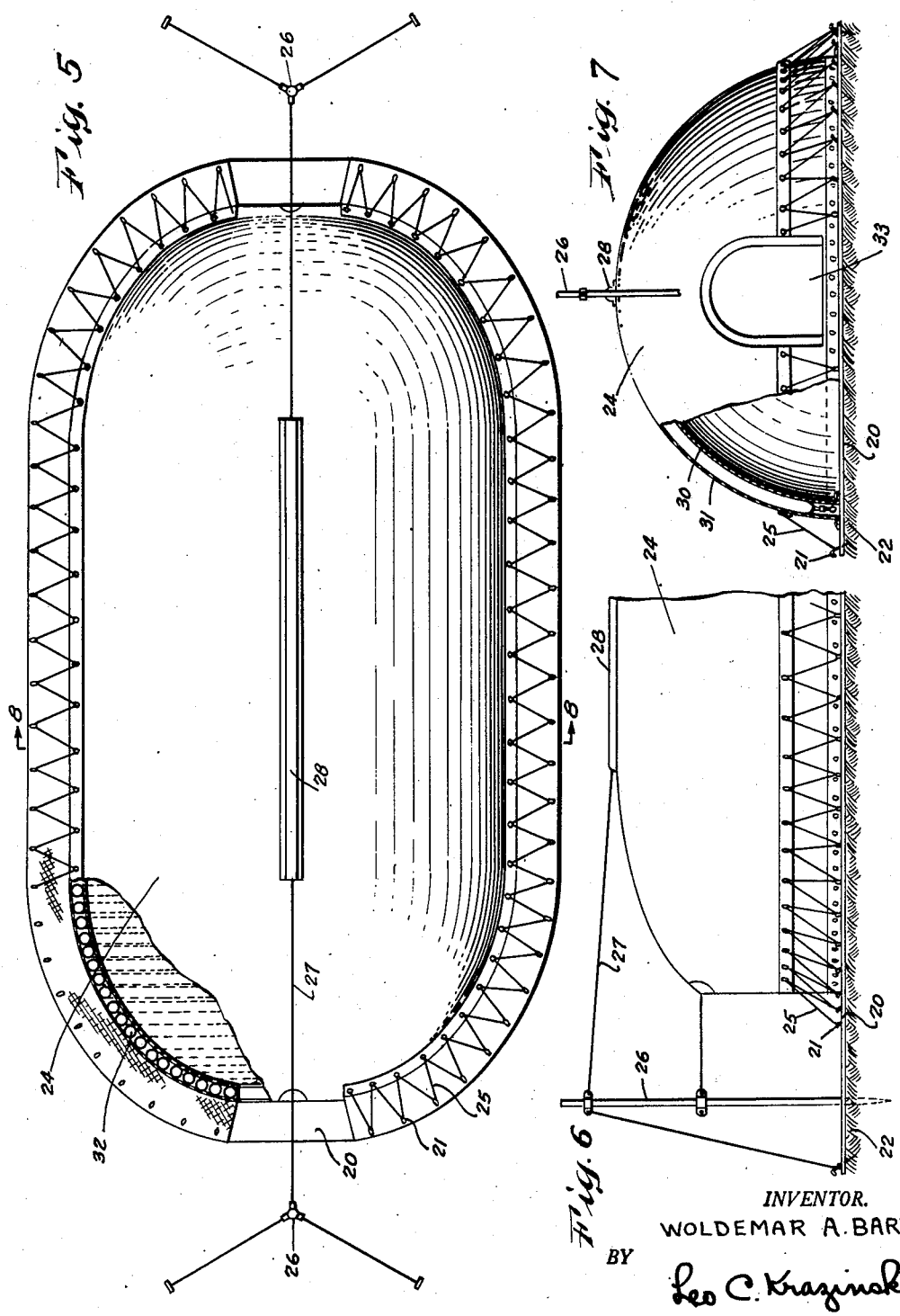

June 3, 1958   W. A. BARY   2,837,101
INFLATABLE STRUCTURE
Filed April 28, 1955   5 Sheets-Sheet 4
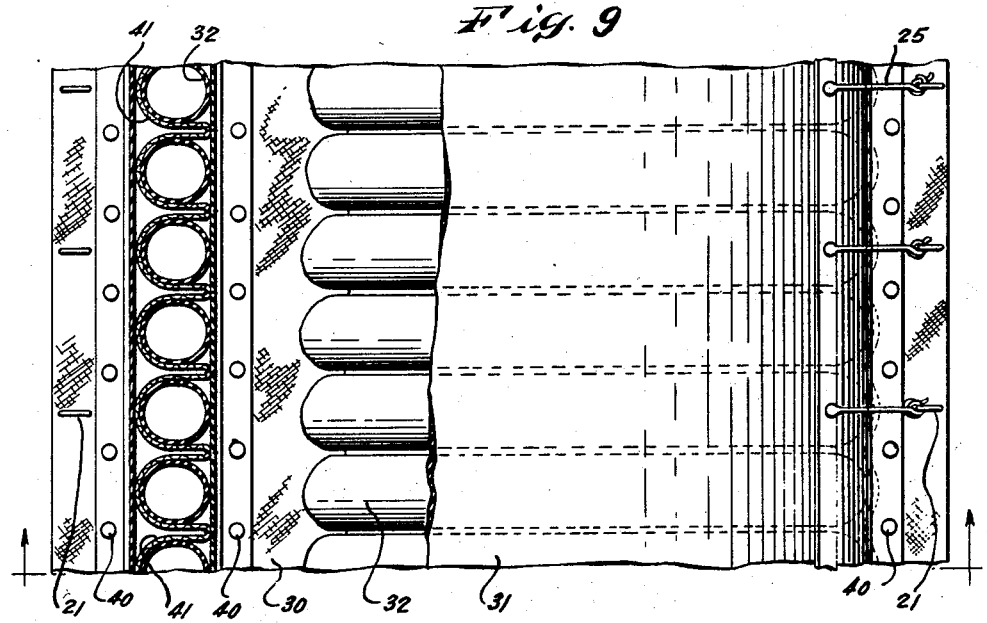
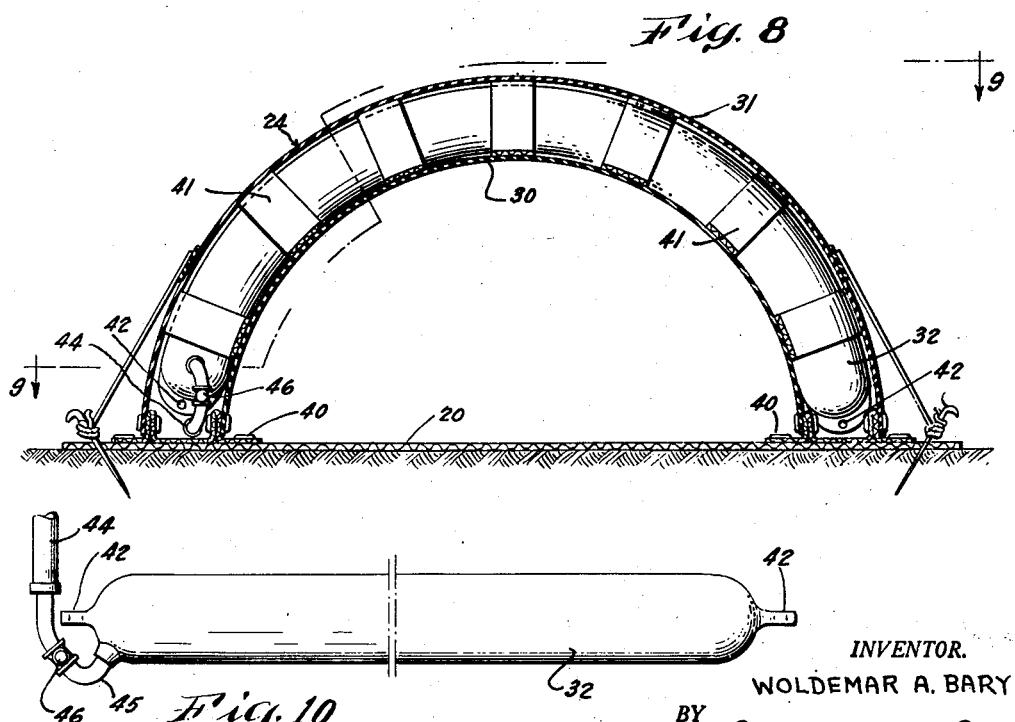
INVENTOR.
WOLDEMAR A. BARY
BY Leo C. Krazinski
ATTORNEY

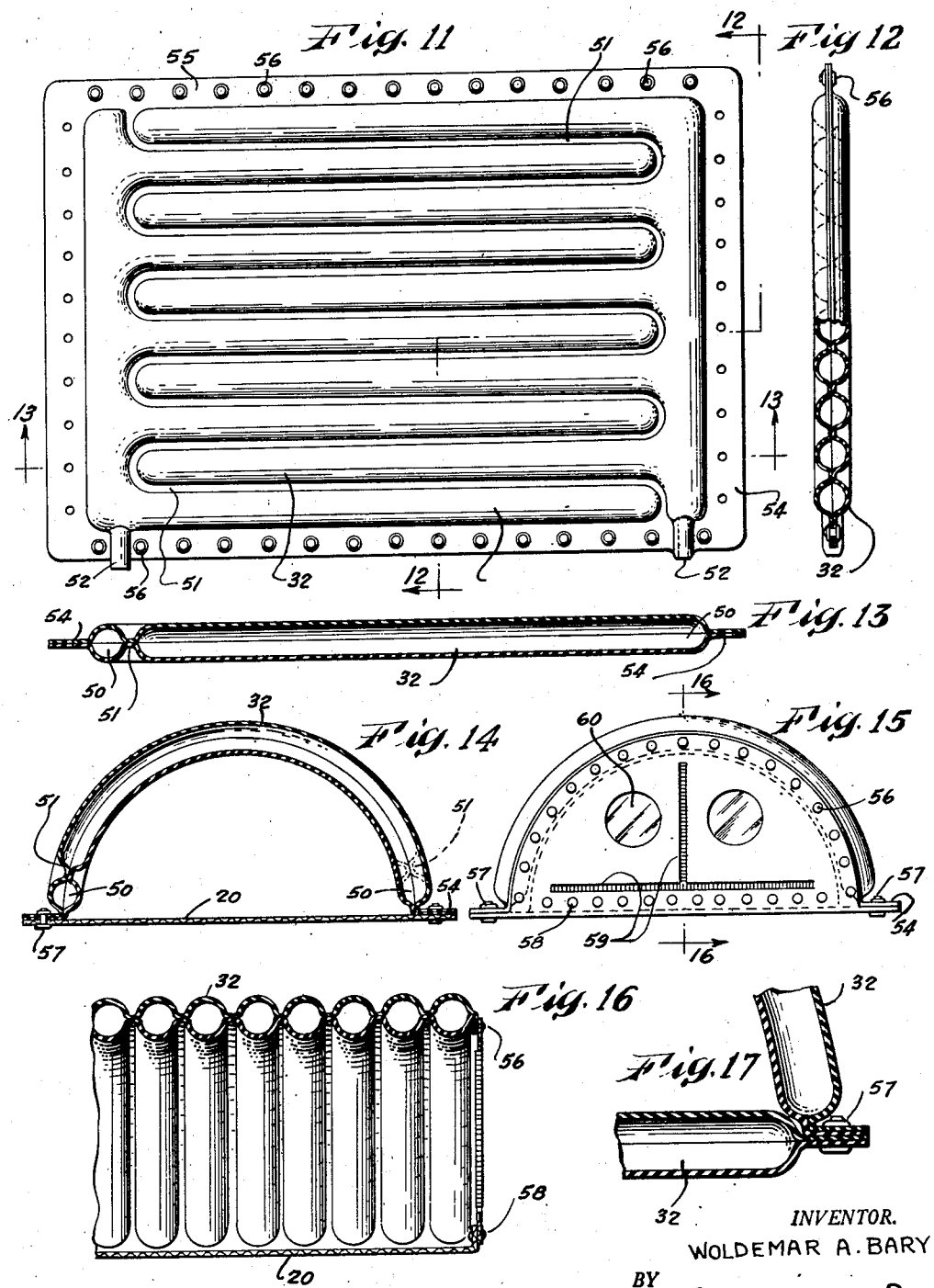

United States Patent Office 2,837,101
Patented June 3, 1958

2,837,101
INFLATABLE STRUCTURE

Woldemar A. Bary, New York, N. Y., assignor to Nina Bary, New York, N. Y.

Application April 28, 1955, Serial No. 504,425

8 Claims. (Cl. 135—1)

The present invention relates to an inflatable structure and, more particularly to such structure which is adapted to be used as the wall and roof and/or floor of various forms of enclosures for sheltering or housing personnel or animals or protecting equipment, apparatus and supplies, as well as plants when the structure is of translucent material, from the elements.

Heretofore, inflatable enclosures were proposed but these had the disadvantage of not being self supporting when of considerable size without the use of supporting structure. Such supporting structure increases the weight, cost and the bulk of the enclosures and, therefore, is objectionable.

Accordingly, an object of the present invention is to provide inflatable enclosures which are so constructed and arranged as to render the same practically self supporting even when of considerable size.

Another object is to provide such enclosures which are light in weight, economical in construction, fast in erection and disassembly, and can be stored and transported when collapsed in a minimum of space.

Another object is to provide such enclosures which are so constructed and arranged as to prevent complete collapse thereof because of localized failure or deflation.

Another object is to provide such enclosures which have inherent insulation qualities and excellent dielectric characteristics.

A further object is to provide such enclosures which can be constructed entirely or in part of an inflatable, unitary structure in accordance with this invention.

Other and further objects will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects generally are accomplished by providing an inflatable structure which comprises a plurality of inflatable tubular wall elements having an arched section, or are adapted to be arched, with the elements arranged side by side in parallel relation to each other and each element having an inlet adjacent one end thereof for admitting inflation medium thereto to stiffen the same, floor structure having the elements connected thereto to maintain the ends thereof in a predetermined spaced relation, and means interconnecting the elements in the aforementioned side by side relation, whereby adjacent elements are capable of supporting each other.

In the drawings:

Fig. 1 is a plan view of an igloo type enclosure embodying the present invention.

Fig. 2 is a side view, partly in section, of the enclosure shown in Fig. 1.

Fig. 3 is a top plan view, partly in section, of a quonset type enclosure.

Fig. 4 is an end elevational view, partly in section, of the enclosure shown in Fig. 3.

Fig. 5 is a plan view, partly in section, of an enclosure of the combined igloo and quonset type.

Fig. 6 is a fragmentary, left side elevational view of the enclosure shown in Fig. 5.

Fig. 7 is an end view, partly in section, of the enclosure shown in Figs. 5 and 6.

Fig. 8 is a sectional view taken along the line 8—8 on Fig. 5.

Fig. 9 is a stepped sectional view taken along the line 9—9 on Fig. 8.

Fig. 10 is a fragmentary plan view of an inflatable element apart from the enclosure structure.

Fig. 11 is a plan view of an inflatable unit adapted to provide the wall and/or floor of the enclosure.

Fig. 12 is a stepped sectional view taken along the line 12—12 on Fig. 11.

Fig. 13 is a sectional view taken along the line 13—13 on Fig. 11.

Fig. 14 is a transverse sectional view of an enclosure wherein the inflatable unit shown in Figs. 11 and 13 provides the wall thereof.

Fig. 15 is an end view of the enclosure shown in Fig. 14.

Fig. 16 is a sectional view taken along the line 16—16 on Fig. 15.

Fig. 17 is a fragmentary sectional view of an enclosure wherein the inflatable unit shown in Figs. 11 and 13 provides both the wall and floor thereof.

Referring to the drawings in detail and, more particularly to Figs. 1 to 7, inflatable structures of several types are shown, of which each includes a floor section 20, stakes 21 for securing the floor section to the ground 22, an inflatable enclosure section 24 secured at its lower edge to the floor section 20, cords 25 secured to the enclosure section 24 and tied to the stakes 21, a pair of upright poles 26, and cords 27 secured to the enclosure section at the top 28 thereof for supporting the enclosure above the floor section in an emergency during high winds or excessive snow.

In each of these views, the enclosure section comprises an inner wall 30, an outer wall 31 and a plurality of inflatable, tubular arched wall elements 32 arranged side by side in parallel relation to each other in the manner described hereinafter.

The structure shown in Figs. 1 and 2 is of the igloo type, and here the elements 32 have arched sections of progressively varying radii to provide a hemispherical or dome-like roof. A doorway 33 is provided at opposite sides thereof.

The structure, shown in Figs. 3 and 4, is of the quonset type and here the elements 32 have arched sections of equal radii to provide a semi-cylindrical roof. This structure is equipped with semi-circular end walls 34 which comprise inner and outer sections 35 and 36 spaced apart to provide an insulating air space 37 therebetween and formed with a doorway 38 and windows 39.

The structure shown in Figs. 5 to 7 has the igloo and quonset features, just described, combined therein, the middle section being of quonset construction and the end sections being like the sides of the igloo structure formed with doorways 33.

In Figs. 8 to 10, the construction and arrangement of the elements 32 are illustrated in detail. As shown, the pliable inner and outer walls 30 and 31, respectively, have their lower edges secured to the floor 20 at 40, and are interconnected by pliable longitudinally extending, circumferentially spaced straps 41 which provide pockets for receiving the elements 32 to maintain the same in side by side relation, whereby adjacent elements are capable of supporting each other. This arrangement provides for attaching the elements to the floor to maintain their ends in a predetermined spaced relationship. If desired, the ends of the elements 32 are formed with fasteners 42 for further securing the same to the outer or inner enclosures. The elements by being so arranged can be removed and replaced individually in the event of failure thereof by attaching the new element to the fastener 42 of the old element and pulling it into place.

In order to inflate the elements 32, a manifold 44 (Fig. 10) is provided for supplying inflation medium from a suitable source (not shown) which is connected to each of the elements by tubes 45. A check valve 46 is connected in each of the tubes 45 to sectionalize the elements and prevent complete deflation of the structure, should one of the elements be punctured or spring a leak. Thus, when one element is so deflated, the elements adjacent thereto remain inflated and support the structural section of the deflated element without any material impairment of the structure.

In Figs. 11 to 17, inflatable elements 32 are shown which are part of a unitary assembly adapted to serve as a floor cushion, mat, or as an arch or end wall of an enclosure of the quonset type. These units comprise a pair of complementary sheets secured together and formed with a pair of parallel manifold passageways 50 at opposite sides thereof having the elements connected thereto with alternate elements having one end connected in fluid flow communication with one of the passageways 50. Adjacent elements 32 are interconnected by a zig-zag web 51, whereby adjacent elements are adapted to support each other. Each of the passageways 50 has an inflation medium supply pipe 52, isolated from each other, so that in the event an element or passageway of one group should fail the other group of elements will not be affected and will remain inflated to support the enclosure.

As shown herein, the unit is rectangular and has side borders 54 and end borders 55 for the purpose about to be described, the end borders being provided with fasteners 56.

In Figs. 14 to 16, the inflatable unit just described is shown with its side borders 54 attached to a floor section 20 at 57 to form an enclosure. The end openings of this enclosure are provided with a pliable wall connected to the unit by the fasteners 56 and to the floor section by fasteners 58. Either one or both of these walls is formed with slits 59 to provide entrance flaps having windows 60.

In Fig. 17, a fragment of an enclosure is shown wherein the floor section is also provided by a unit formed with inflatable elements 32.

From the foregoing description, it will be seen that the present invention provides an improved, inflatable structure which is sturdy, light in weight, and can be of any desired size and a variety of shapes.

The structures shown by way of example herein may be used in many fields of application, for example,

1. Military services

| | |
|---|---|
| Hospital units | Aircraft shelter |
| Maintenance shelter | Radar housing |
| Personnel housing | Vehicle shelter |
| Field barracks | Gun emplacements |
| Field headquarters | Photographic units |
| Weather stations | Meteorological groups |

2. Civilian agencies

| | |
|---|---|
| Civilian defense | Red Cross shelter |
| Evacuation housing | U. N. Displaced Person shelter |

3. Domestic uses

| | |
|---|---|
| Hunting | Camping |
| Vehicle covers | Cabanas |
| Prospecting | Construction camps |
| Exploring | Boat canopy |
| Surveying | Portable garages |
| Greenhouses | Beach houses |
| | Children's playhouse |

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. An inflatable structure comprising a plurality of inflatable tubular arched wall elements of uniform cross section arranged side-by-side in parallel relation to each other and terminated in spaced apart vertical ends, said arched wall elements forming a chamber having at least one of said elements of a predetermined radius at its center and having a plurality of said elements of progressively reduced radii flanking said central element, each of said elements being individually replaceable and having an inflation medium entrance, means for securing ends of said elements in predetermined spaced relation, means for enclosing and interconnecting said elements to maintain the same in side-by-side relation, whereby adjacent elements, when inflated, are capable of supporting each other, and means at said spaced apart vertical ends for entering said chamber.

2. Structure according to claim 1, wherein said securing means includes a floor structure adapted to be anchored to ground.

3. Structure according to claim 2, wherein said floor structure includes an inflatable member.

4. Structure according to claim 1, wherein said interconnecting means are straps to enable said elements to be singly replaceable.

5. Structure according to claim 1, wherein said arched wall elements form and arcuate roof and said securing means includes a floor structure adapted to be anchored to the ground.

6. An inflatable structure comprising a plurality of inflatable tubular arched wall elements arranged side-by-side in parallel relation to each other and each element being individually replaceable and having an inlet for admitting inflation medium thereto to stiffen the same, said arched wall elements terminating in spaced apart vertical ends and said arched wall elements forming a chamber having at least one of said elements of a predetermined radius at its center and having a plurality of said elements of progressively reduced radii flanking said central element, floor structure having said elements attached thereto to maintain the ends thereof in a predetermined spaced relation, means for enclosing and interconnecting said elements to maintain the same in said side-by-side relation whereby adjacent elements are capable of supporting each other, and means at said spaced apart vertical ends for entering said chamber.

7. Structure according to claim 6, including manifold means in fluid flow connection with said inlets of said elements.

8. Structure according to claim 6, including pliable inner and outer walls and pliable straps connected to said inner wall to provide pockets for receiving said elements and to thereby serve as said interconnecting means.

References Cited in the file of this patent

UNITED STATES PATENTS

| | | |
|---|---|---|
| 511,472 | Sumovski | Dec. 26, 1893 |
| 659,981 | McCall | Oct. 16, 1900 |
| 1,342,234 | Smith | June 1, 1920 |
| 2,411,316 | Capita | Nov. 19, 1946 |
| 2,656,844 | Kreuzer | Oct. 27, 1953 |
| 2,657,716 | Ford | Nov. 3, 1953 |
| 2,698,020 | Phane | Dec. 28, 1954 |
| 2,752,928 | Barker | July 3, 1956 |

FOREIGN PATENTS

| | | |
|---|---|---|
| 244,217 | Switzerland | Mar. 17, 1947 |